United States Patent
Kim et al.

(10) Patent No.: US 6,494,837 B2
(45) Date of Patent: Dec. 17, 2002

(54) SYSTEM AND METHOD FOR THREE-DIMENSIONAL ULTRASOUND IMAGING USING A STEERABLE PROBE

(75) Inventors: Sang-Hyun Kim, Seoul (KR); Seok-Bin Ko, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 18 days.

(21) Appl. No.: 09/877,866

(22) Filed: Jun. 8, 2001

(65) Prior Publication Data

US 2002/0004633 A1 Jan. 10, 2002

(30) Foreign Application Priority Data

Jun. 10, 2000 (KR) .......................................... 2000-31929

(51) Int. Cl.[7] ................................................. A61B 8/00
(52) U.S. Cl. ....................................... 600/443; 128/916
(58) Field of Search ................................. 600/437, 438, 600/439–447, 449–459, 466–471, 479; 73/625, 626; 367/7, 11, 138; 128/916

(56) References Cited

U.S. PATENT DOCUMENTS

| | | | | |
|---|---|---|---|---|
| 4,873,985 A | * | 10/1989 | Nakajima | 600/441 |
| 5,255,681 A | * | 10/1993 | Ishimura et al. | 600/437 |
| 5,313,948 A | * | 5/1994 | Murashita et al. | 600/443 |
| 5,497,776 A | * | 3/1996 | Yamazaki et al. | 128/916 |
| 5,515,849 A | * | 5/1996 | Murashita et al. | 600/479 |
| 5,582,173 A | * | 12/1996 | Li | 128/916 |
| 5,782,766 A | * | 7/1998 | Weng et al. | 128/916 |
| 5,873,830 A | * | 2/1999 | Hossack et al. | 600/447 |
| 5,967,985 A | * | 10/1999 | Hayakawa | 600/440 |

* cited by examiner

*Primary Examiner*—Marvin M. Lateef
*Assistant Examiner*—Ali M. Imam
(74) *Attorney, Agent, or Firm*—Wiggin & Dana LLP; Dale L. Carlson; Michael K. Kinney

(57) ABSTRACT

A system and a method generate a 3-D image by fast computing the distance between adjacent 2-D images. The method comprises the steps of: producing a first main frame, a second main frame parallel to the first main frame, and a supplementary frame inclined at an angle with respect to the first main frame; creating a virtual frame by using the first main frame and the supplementary frame; calculating a first correlation coefficient between the first main frame and the virtual frame; computing a second correlation coefficient between the first and second main frames; and estimating a distance between the first and second main frames. The system comprises a probe for generating pairs of image frames; a distance calculating unit for calculating distances between main frames of the pairs; and a screen for displaying a 3-D image of the target produced by using the distances.

11 Claims, 7 Drawing Sheets

$i^{th}$ frame     $(i+1)^{th}$ frame

Fig. 4

Fig. 5A first beam former

Fig. 5B

Second beam former

SYSTEM AND METHOD FOR THREE-DIMENSIONAL ULTRASOUND IMAGING USING A STEERABLE PROBE

BACKGROUND OF THE INVENTION

1. Field of the Invention

The present invention relates to a system and a method for generating a three-dimensional (3-D) image of an object by using two-dimensional (2-D) images of the object; and, more particularly, to a system and a method for generating a 3-D image by fast computing the distance between adjacent 2-D images.

2. Description of the Related Art

Ultrasound imaging systems are gaining popularity in medical diagnostics and non-destructive inspection fields. In ultrasound imaging systems, an array of transducers or a probe generate and transmit an ultrasound signal and receive the ultrasound signal reflected from a target being scanned. The received ultrasound signal is processed to display an image of the target.

Two-dimensional (2-D) ultrasound imaging systems generate a 2-D image of a target by transmitting and receiving an ultrasound signal in a single scan plane. The generated 2-D image represents only one cross-section of the target. Thus, the overall structure or shape of the target is not readily recognized.

Figure 1:
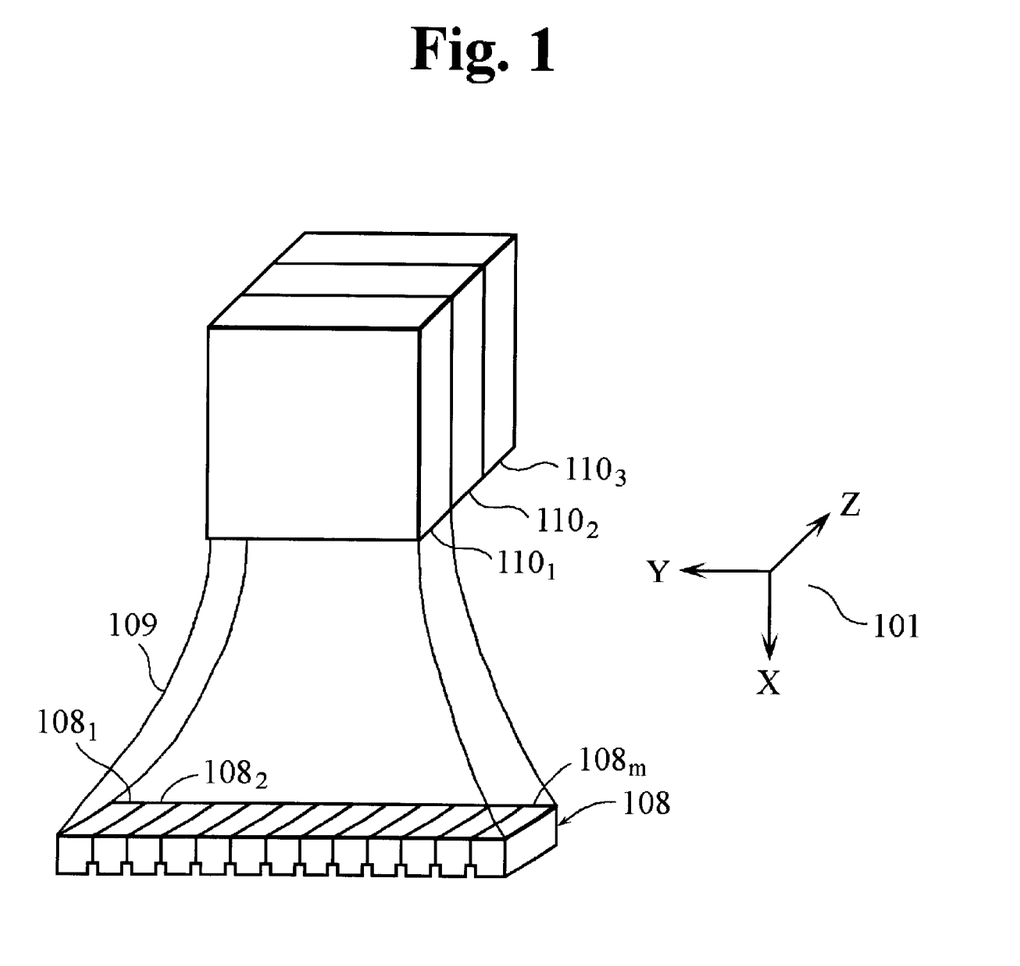
FIG. 1 shows a series of 2-D image frames of a target being scanned by a probe.

In order to produce a 3-D image of the target, a series of 2-D images were obtained by moving a probe in a predetermined direction over the target. FIG. 1 shows a series of 2-D image frames of a target, each representing a different cross-section of the target. The frame of reference is an orthogonal depth-lateral-elevation (X-Y-Z) coordinate system $101$. X-axis represents the scanning depth; Y-axis represents the direction of arrangement of "m" transducers $108_1$ to $108_m$; and Z-axis represents the moving direction of a probe $108$ or an array of transducers $108_1$ to $108_m$. The probe $108$ can generate a 2-D image frame $110_1$ by transmitting and receiving an ultrasound signal and processing the ultrasound signal reflected from the target to be examined. Repeating the above steps by moving the probe along Z-axis, a series of 2-D image frames $110_1$ to $110_3$ of the target could be obtained. A 3-D image of the target would be produced by synthesizing the series of 2-D image frames $110_1$ to $110_3$.

Producing the 3-D image in a manner described above requires accurately measuring distances between adjacent 2-D image frames $110_1$ to $110_3$. The distance between a pair of adjacent frames is computed as the product of the velocity and moving period of time of the probe $108$ between the pair. When the user moves the probe $108$ manually, however, it is difficult to move the probe $108$ with a constant velocity. Without knowing the velocity of the probe $108$, it is not possible to accurately calculate the distance even if when 2-D images were generated is known.

To address this problem, "a speckle noise" appearing on the respective 2-D image frames has been taken advantage of estimating the distance. The speckle noise means a noise appearing on a screen as a speckle, which is caused when objects in the scanning area smaller than the wavelength of an ultrasound signal disperses or interferes with the reflected signal. Since speckles in image frames have similar, as the image frames are closer to each other, the correlation of speckles in two different image frames could be used to estimate the distance between the two image frames.

Figure 2:
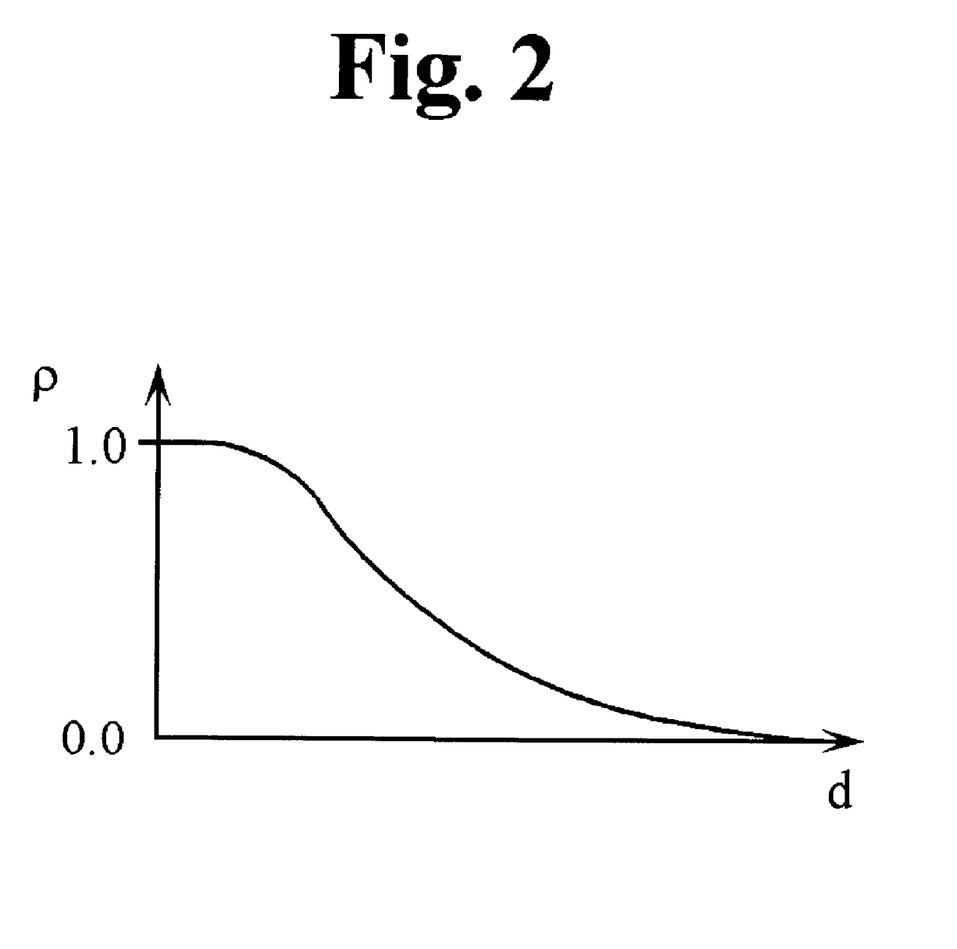
FIG. 2 represents a speckle correlation as a function of a distance for an experimental phantom.

For the speckle correlation, an experimental phantom, composed of a material whose speckle characteristics are known, is first prepared; and then a series of 2-D image frames for the experimental phantom are produced by moving a probe at a predetermined velocity over a predetermined distance. Now, distances between adjacent 2-D image frames are known, it is possible to obtain relationship between speckle correlation and distance by computing the speckle correlation between a pair of image frames. FIG. 2 illustrates the speckle correlation as a function of the distance. In FIG. 2, $\rho$ is a speckle correlation and d is a distance between consecutive two 2-D image frames.

Armed with the function, a series of 2-D image frames of an actual target are generated. And, speckle correlation between each adjacent pairs of the 2-D image frames is calculated. Finally, the distance between them is estimated by using the experimentally obtained speckle correlation/distance function. Thereafter, the series of 2-D image frames are compiled by using the estimated distances, to finally produce a 3-D image of the target.

Figure 3:
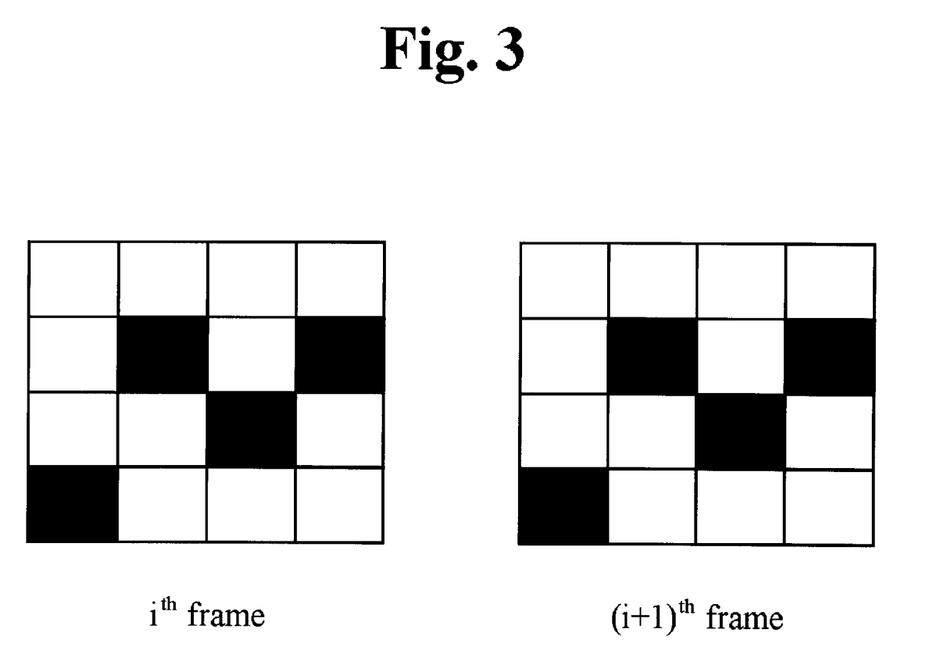
FIG. 3 exemplifies consecutive two 2-D (two-dimensional) image frames of a target being scanned, each image frame being divided into a plurality of sub-blocks to identify regions having speckles.

For example, the 2-D image frames are composed of not only speckle regions but also of regions representing inner structures or shapes of the target. In order to estimate distances between all the pairs of adjacent 2-D image frames by using the speckle correlation computed as described above, it is required to extract the speckle regions from them. FIG. 3 exemplifies consecutive two 2-D image frames of a target, e.g., $i^{th}$ and $(i+1)^{th}$ image frames, each image frame being divided into a plurality of sub-blocks to identify regions having speckles. The speckle regions are denoted as dark squares. According to the method described above, the speckle correlation between $i^{th}$ and $(i+1)^{th}$ image frames is calculated by using sub-blocks having speckle noise only.

However, when the target has substantially different characteristics from the experimental phantom, which is to be scanned, the estimated distance between two 2-D image frames of the target would have errors. Also, it is difficult to extract the speckle regions from the respective 2-D image frames. Furthermore, it is time-consuming to extract the speckle regions from the respective 2-D image frames.

SUMMARY OF THE INVENTION

It is one objective of the present invention to provide a method for estimating, simple and accurately, the distance between adjacent 2-D image frames obtained by moving a probe manually in a predetermined direction.

It is the other objective of the present invention to provide a system and a method for generating a 3-D image by fast computing the distance between adjacent 2-D image frames, which are obtained by moving a probe in a predetermined direction over a target to be examined.

In accordance with an aspect of the present invention, there is provided a method for calculating a distance between consecutive two image frames obtained by moving a probe over a target to be examined, wherein the probe transmits and receives ultrasound signals, comprising the steps of: a) producing a first main frame, a second main frame parallel to the first main frame, and a supplementary frame inclined at an angle with respect to the first main frame; b) creating a virtual frame parallel to the first main frame by using the first main frame and the supplementary frame; c) calculating a first correlation coefficient between the first main frame and the virtual frame; d) computing a second correlation coefficient between the first and second main frames; and e) estimating a first distance between the first and second main frames by using the first and second correlation coefficients and a second distance between the first main frame and the virtual frame.

In accordance with another aspect of the present invention, there is provided a method for producing a 3-D image of a target to be examined, comprising the steps of: a) generating pairs of image frames by moving a probe over the target; b) creating a virtual frame parallel to the main frame by using the main and supplementary frames; c) calculating a first correlation coefficient between the main frame and the virtual frame; d) computing a second correlation coefficient between the main frame and a next main frame adjacent to the main frame; e) estimating a first distance between the main frame and the next main frame by using the first and second correlation coefficients and a second distance between the main frame and the virtual frame; f) repeating the steps a) to e) for the remaining main frames of the pairs; and g) producing a 3-D image of the target by using the first distances for all the main frames of the pairs.

In accordance with yet another aspect of the present invention, there is provided a system for producing a 3-D image of a target to be examined, comprising: a probe for generating pairs of image frames by moving a probe over the target; means for calculating distances between the main frames of the pairs; and means for displaying a 3-D image of the target produced by using the distances, wherein the means for calculating the distances includes: means for creating a virtual frame by using the main and supplementary frames; means for calculating a first distance and a first correlation coefficient between the main frame and the virtual frame, and a second correlation coefficient between the main frame and an adjacent main frame; and means for estimating a second distance between the main frame and the adjacent main frame by using the first distance and the first and second correlation coefficients.

BRIEF DESCRIPTIONS OF THE DRAWINGS

The above and other objects and features of the present invention will become apparent from the following description of preferred embodiments given in conjunction with the accompanying drawings, in which.

DETAILED DESCRIPTION OF THE PRESENT INVENTION

Figure 4:
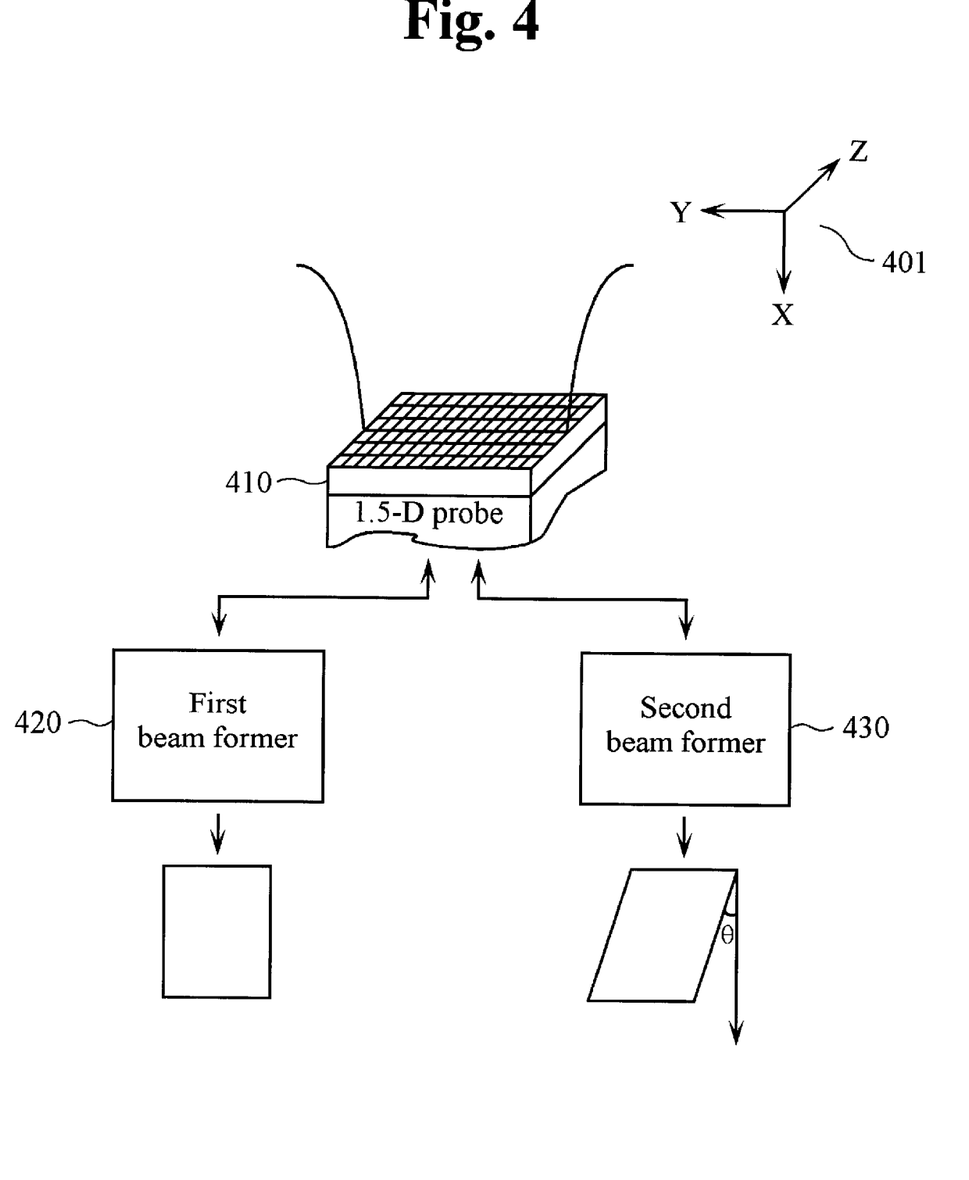
FIG. 4 provides a diagram for explaining a procedure of generating a pair of image frames by using a 1.5-D probe in accordance with the present invention.

FIG. 4 shows a diagram for explaining a procedure of generating a pair of image frames of a target (not shown) to be examined by using a 1.5-D probe 410. In accordance with an embodiment of the present invention, the 1.5-D probe 410 is used to generate a pair of image frames of the target, the two image frames being at an angle with respect to each other. As shown in FIG. 4, the frame of reference is an orthogonal depth-lateral-elevation (X-Y-Z) coordinate system 401 similar to the reference numeral 101 in FIG. 1. X-axis represents the scanning depth; Y-axis represents the direction of arrangement of transducers; and Z-axis represents the moving direction of the 1.5-D probe 410. It is noted that a 1-D probe consists of a plurality of in-line transducers while the 1.5-D probe 410 is made of a multiplicity of such 1-D probes. The 1-D probe arrayed on the lateral direction can focus ultrasound signals on one scan plane, e.g., X-Y plane, only.

The 1.5-D probe 410 could focus ultrasound signals on X-Y plane as well as on a plane inclined at an angle with respect to the X-Y plane. A first beam former 420 produces a first 2-D image frame of the target on the X-Y plane while a second beam former 430 generates a second 2-D image frame of the target inclined at an angle with respect to the first 2-D image frame. The two beam formers 420 and 430 are shown as separated in FIG. 4, but a single beam former may be used to produce two image frames at an angle. For example, the single beam former could generate the first 2-D image frame in a first transmission of ultrasound signals; and it would subsequently produce the second 2-D image in a second transmission of ultrasound signals.

Figure 5A:
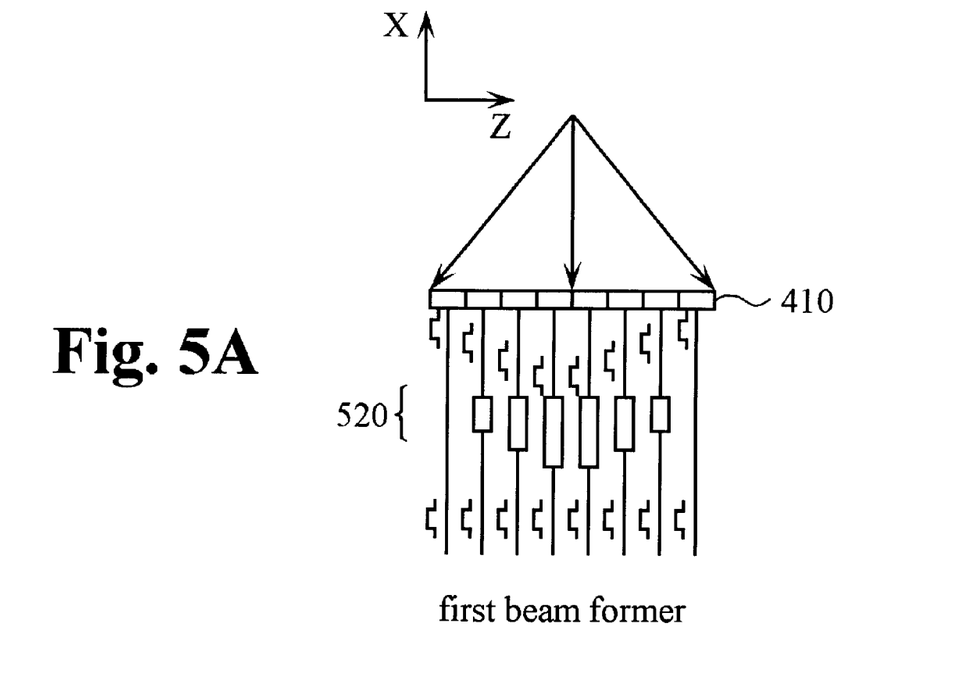
FIGS. 5A and 5B illustrate time delays applied to transducers of the 1.5-D probe, in order to focus ultrasound signals.
Figure 5B:
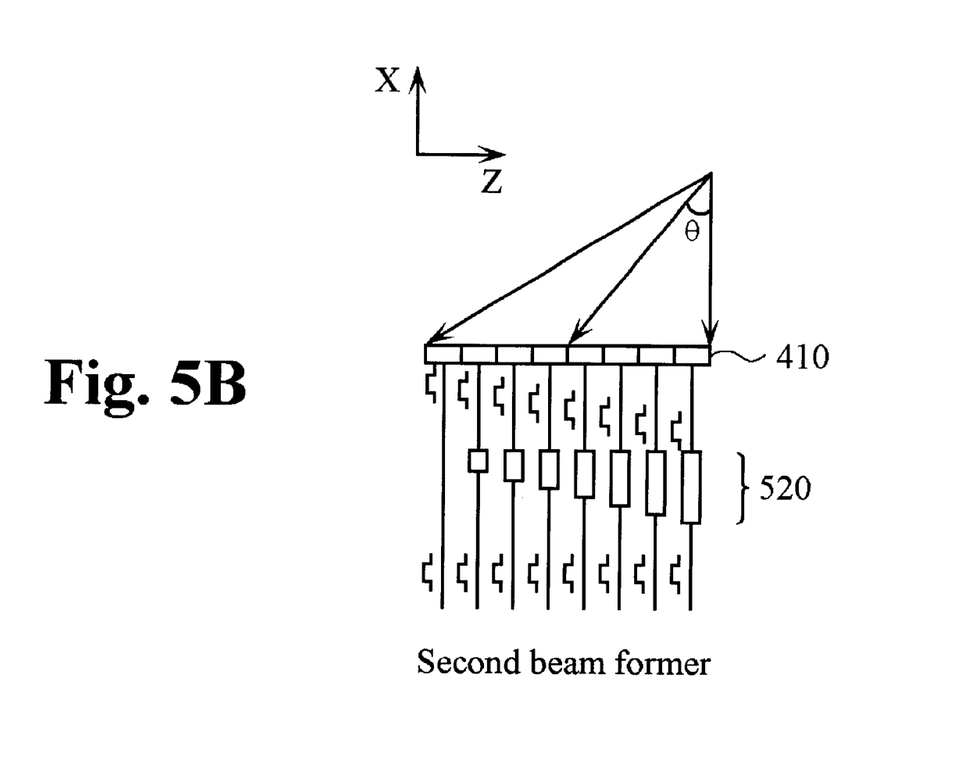

FIGS. 5A and 5B illustrate time delays applied to the transducers of the 1.5-D probe 410, in order to focus ultrasound signals at the first and second beam formers 420 and 430, respectively. As shown in FIG. 5A, the ultrasound signals can be focused on X-Y plane by adjusting the time delays generated from a time delay block 520, to thereby apply the same to the 1.5-D probe 410. In FIG. 5B, the ultrasound signals can be focused on a plane inclined at an angle of θ with respect to the X-Y plane in a manner similar to as in FIG. 5A. As a result, it is possible to produce a pair of 2-D image frames of the target. In other words, a first 2-D image frame is produced by the 1.5-D probe 410 and the second is a second 2-D image frame inclined at the angle of θ with respect to the first 2-D image frame. Although the 1.5-D probe 410 is shown, the present invention can employ other probes, such as a steerable probe, that are capable of producing 2-D image frames having a scanning angle difference between the two 2-D image frames.

Figure 6:
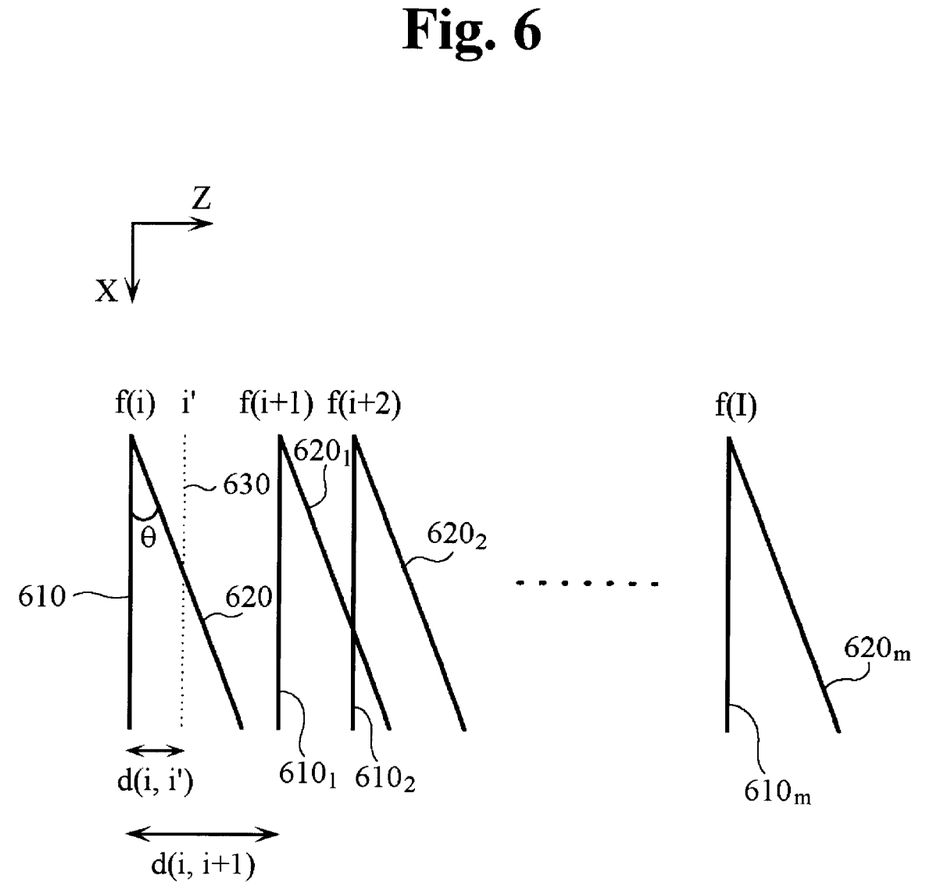
FIG. 6 presents pairs of 2-D image frames produced by moving the 1.5-D probe along Z-axis in accordance with the present invention.

FIG. 6 presents pairs of 2-D image frames produced by moving the 1.5-D probe 410 along Z-axis, in accordance with an embodiment of the present invention. A pair of $i^{th}$ image frames f(i) consists of two image frames 610 and 620 whose relations are as described above. The main frame 610 is used to produce a 3-D image of a target, while the supplementary frame 620 is used to generate a virtual frame 630 in order to estimate the distance between two adjacent main frames 610 to $610_m$. As illustrated in FIG. 6, the virtual frame 630 is parallel to the main frame 610 and intersects the supplementary frame 620 at the predefined angle θ. The virtual frame 630 can be created from the main frame 610 and the supplementary frame 620 via interpolation and/or extrapolation as is well known in the art. Specifically, a portion of the virtual frame 630 located between the main frame 610 and the supplementary frame 620 can be generated by interpolation, while the remaining portion can be produced by extrapolation. For the convenience of explanation, a virtual frame generated from the $i^{th}$ main frame 610 and supplementary frame 620 is represented by $(i')^{th}$ virtual frame 630.

The distance d(i,i') between the $i^{th}$ main frame 610 and (i') the virtual frame 630 is given as follows:

$$d(i, i') = \frac{L}{2}\sin\theta \qquad \text{Eq. (1)}$$

wherein, L is a scanning depth of the $i^{th}$ supplementary frame 620.

This equation is based on the assumption that the $(i')^{th}$ virtual frame 630 intersects the center of the $i^{th}$ supplementary frame 620.

The distance (i,i') is used to estimate d(i,i+1), which is the distance between the $i^{th}$ main frame 610 and an (i+1) main frame $610_1$, as described below.

First, the distance and correlation between two adjacent image frames can be expressed as follows:

$$\rho(i, j) = e^{\alpha_{i,j} d(i,j)}, \; \rho(i, j) = \frac{K(i, j)}{\sigma_i \sigma_j} \qquad \text{Eq. (2)}$$

wherein, $\rho(i,j)$ is the correlation coefficient between $i^{th}$ and $j^{th}$ image frames; $\alpha_{ij}$ is a distance constant; d(i,j) is the distance between $i^{th}$ and $j^{th}$ image frames; $\alpha_i$ is the standard deviation of the $i^{th}$ image frame; and K(i,j) is the covariance between the $i^{th}$ and $j^{th}$ image frames.

The distance d(i,i+1) between the $i^{th}$ and $(i+1)^{th}$ image frames can be derived from Eq. (2), as follows:

$$d(i, i+1) = \frac{1}{\alpha_{i,i+1}} \ln \rho(i, i+1) \qquad \text{Eq. (3)}$$

In order to calculate the distance d(i,i+1), a correlation coefficient $\rho(i,i+1)$ and a distance constant $\alpha_{i,i+1}$ must be computed. The correlation coefficient $\rho(i,i+1)$ can be calculated from data of the $i^{th}$ and $(i+1)^{th}$ image frames. In accordance with the present invention, a distance constant $\alpha_{i,i'}$ between the $i^{th}$ and $(i')^{th}$ image frames is used, instead of the distance constant $\alpha_{i,i+1}$ between the $i^{th}$ and $(i+1)^{th}$ image frames. This is because the distance constant $\alpha_{i,i+1}$ could be approximated to the distance constant $\alpha_{i,i'}$ in case that the distance between the $i^{th}$ and $(i+1)^{th}$ image frames is such that there is no statistical variation. The distance constant $\alpha_{i,i'}$ of Eq. (3) is obtained as follows:

$$\alpha_{i,i'} = \frac{1}{d(i, i')} \ln \rho(i, i'). \qquad \text{Eq. (4)}$$

Substituting the distance constant $\alpha_{i,i+1}$ with $\alpha_{i,i'}$, the distance d(i,i+1) between the $i^{th}$ and $(i+1)^{th}$ frames can be approximated as follows:

$$d(i, i+1) \cong d(i, i') \frac{\ln \rho(i, i+1)}{\ln \rho(i, i')}. \qquad \text{Eq. (5)}$$

The distance d(i,i') is calculated from Eq. (1); and the correlation coefficient $\rho(i,i')$ between the $i^{th}$ main frame 610 and the $(i')^{th}$ virtual frame 630 is calculated from the data of these image frames.

In sum, the $(i')^{th}$ virtual frame 630 is generated from the data of the $i^{th}$ main and supplementary frames 610 and 620; and then the distance between the $i^{th}$ and $(i+1)^{th}$ main frames 610 and $610_1$ is calculated from Eq. (5) by using the $(i')^{th}$ virtual frame 630. By repeating this calculation for other adjacent main image frames of the target, the distance between each pair of adjacent main image frames can be calculated.

Figure 7:
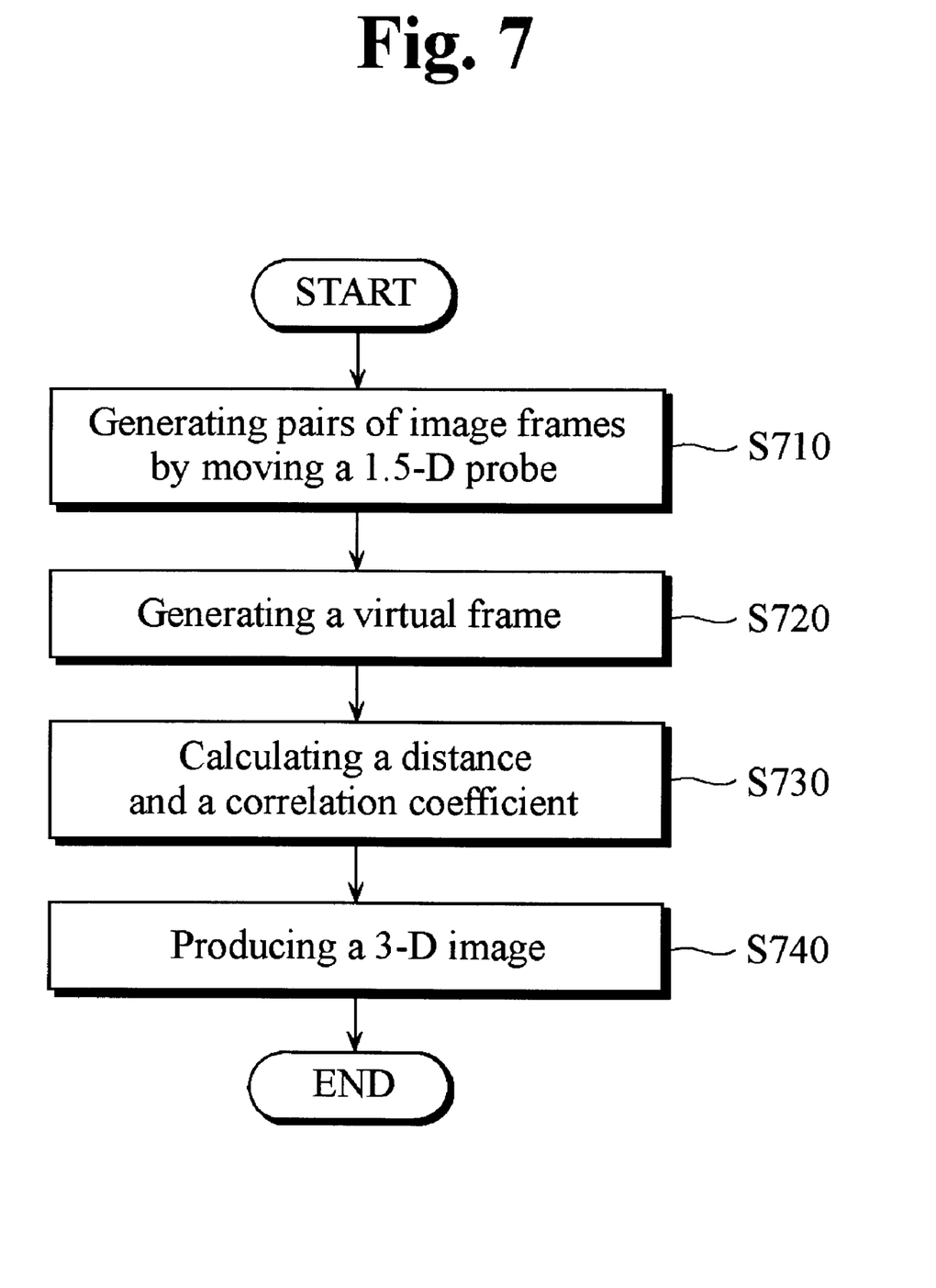
FIG. 7 draws a flow chart for explaining a 3-D imaging method in accordance with the present invention.

FIG. 7 draws a flow chart for explaining a 3-D imaging method in accordance with the present invention. At step S710, pairs of image frames of a target being scanned are generated by moving the 1.5-D probe 410 in a predetermined direction. Each pair includes a main frame and a supplementary frame. The supplementary frame is inclined at a predefined angle with respect to the main frame. At step S720, a virtual frame parallel to the main frame is generated for each of the pairs of the image frames. The virtual frame can be generated from the main and supplementary frames by using interpolation and/or extrapolation as is well known in the art. At step S730, the distance and the correlation coefficient between the main frame and the virtual frame are calculated; and then the distance between each pair of adjacent main frames is computed by using Eq. (5). At step S740, a 3-D image of the target is produced from the image frames by using the distances calculated at step S730. Finally, the 3-D image can be displayed through the rendering technique, for instance.

In accordance with another embodiment of the present invention, the distance between adjacent main frames can be estimated by dividing each image frame into a plurality of sub-frames, using a predetermined sub-frame among the sub-frames. If a correlation coefficient is calculated between the sub-frames, it is possible to reduce the time and amount of calculation required for the distance calculation. Here, a sub-frame to be used in the distance calculation can be selected in various manners. For example, sub-frames representing the speckle noise can be only chosen.

In accordance with the yet another embodiment of the present invention, the velocity of the probe is estimated at a specific frame and compared with that at the next frame. The probe velocity can be calculated from an estimated distance between adjacent frames and generation time difference between the adjacent frames. In case that the difference is over a predetermined threshold, the sudden change in the probe could be a reason. However, it is more likely that an error occurred in estimating the distance for the specific frame because the probe is moved uniformly, even manually. In this case, the specific frame could opted out in producing the 3-D image of the target. Instead, the average distance would be used as the distance.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. A method for calculating a distance between consecutive two image frames obtained by moving a probe over a target to be examined, wherein the probe transmits and receives ultrasound signals, comprising the steps of:

a) producing a first main frame, a second main frame parallel to the first main frame, and a supplementary frame inclined at an angle with respect to the first main frame;

b) creating a virtual frame parallel to the first main frame by using the first main frame and the supplementary frame, wherein the virtual frame intersects the supplementary frame;

c) calculating a first correlation coefficient between the first main frame and the virtual frame;

d) computing a second correlation coefficient between the first and second main frames; and e) calculating a first distance between the first main frame and the virtual frame to estimate a second distance between the first and second main frames by using the first distance and the first and second correlation coefficients.

2. The method of claim 1, wherein the probe is a 1.5 dimensional (1.5-D) probe made of a plurality of 1-D probes,
wherein each 1-D probe consists of in-line transducers.

3. The method of claim 1, wherein the step e) includes:
   e1) dividing the main frame and the virtual frame into a multiplicity of sub-frames, respectively; and
   e2) estimating the second distance by using predetermined sub-frames among said multiplicity of sub-frames.

4. A method for producing a 3-D image of a target to be examined, comprising the steps of:
   a) generating pairs of image frames by moving a probe over the target, wherein each pair includes a main frame and a supplementary frame inclined at an angle with respect to the main frame and the probe transmits and receives ultrasound signals;
   b) creating a virtual frame of said each pair by using the main and supplementary frames of all the pairs, wherein the virtual frame is parallel to the main frame;
   c) calculating a first correlation coefficient between the main frame and the virtual frame;
   d) computing a second correlation coefficient between the main frame and a next main frame adjacent to the main frame;
   e) estimating a first distance between the main frame and the next main frame by using a second distance between the main frame and the virtual frame and the first and second correlation coefficients;
   f) repeating the steps a) to e) for the remaining main frames of the pairs; and
   g) producing the 3-D image of the target by using the first distances for all the main frames of the pairs.

5. The method of claim 4, wherein the probe is a 1.5-D probe made of a plurality of 1-D probes, wherein each 1-D probe consists of in-line transducers.

6. The method of claim 4, wherein the step e) includes:
   e1) dividing the main frame and the virtual frame into a multiplicity of sub-frames, respectively; and
   e2) estimating the second distance by using predetermined sub-frames among said multiplicity of sub-frames.

7. The method of claim 6, wherein each of the predetermined sub-frames represents a speckle noise.

8. The method of claim 4, further comprising the steps of:
   h) estimating a velocity of the probe at each of the main frames of the pairs;
   i) comparing the probe velocity between the main frames to select main frames having a velocity difference over a predefined threshold; and
   j) deleting the selected main frames in the production of the 3-D image of the target.

9. The method of claim 4, further comprising the steps of:
   k) estimating a velocity of the probe at each of the main frames of the pairs;
   l) selecting main frames having a difference of the probe velocity compared with that of an adjacent main frame over a predefined threshold; and
   m) setting a distance between the selected main frames and the adjacent main frame to an average distance, wherein the average distance represents an average of distances between the main frames of the pairs.

10. A system for producing a 3-D image of a target to be examined, comprising:
    a probe for generating pairs of image frames by moving a probe over the target, wherein each pair includes a main frame and a supplementary frame inclined at an angle with respect to the main frame and the probe transmits and receives the ultrasound signals;
    means for calculating distances between the main frames of the pairs; and
    means for displaying a 3-D image of the target produced by using the distances,
    wherein the means for calculating the distances includes:
       means for creating a virtual frame by using the main and supplementary frames, wherein the virtual frame is parallel to the main frame and intersects the supplementary frame;
       means for calculating a first distance and a first correlation coefficient between the main frame and the virtual frame, and a second correlation coefficient between the main frame and an adjacent main frame; and
       means for estimating a second distance between the main frame and the adjacent main frame by using the first distance and the first and second correlation coefficients.

11. The system of claim 10, wherein the probe is a 1.5-D probe made of a plurality of 1-D probes, wherein each 1-D probe consists of in-line transducers.

* * * * *